United States Patent [19]

Mattimoe et al.

[11] 4,242,403
[45] Dec. 30, 1980

[54] AUTOMOTIVE GLAZING UNITS AND METHOD OF PRODUCING THE SAME

[75] Inventors: Paul T. Mattimoe, Toledo; Theodore J. Motter, Genoa; Stephen P. Bartus, Jr., Toledo, all of Ohio

[73] Assignee: Libbey-Owens-Ford Company, Toledo, Ohio

[21] Appl. No.: 710,424

[22] Filed: Aug. 2, 1976

[51] Int. Cl.³ .................. B32B 7/02; B32B 17/10
[52] U.S. Cl. .............................. 428/213; 428/216; 428/437; 428/448; 428/451; 428/480; 428/483
[58] Field of Search ............. 428/447, 437, 451, 448, 428/480, 216, 483, 213; 427/372 A, 379, 387, 407 G

[56] References Cited

U.S. PATENT DOCUMENTS

| | | | |
|---|---|---|---|
| 2,692,844 | 10/1954 | Hyde | 428/447 |
| 2,976,184 | 3/1961 | Blatz | 428/447 |
| 2,976,185 | 3/1961 | McBride | 428/447 |
| 3,231,461 | 1/1966 | Mattimoe | 428/437 |
| 3,451,838 | 6/1969 | Burzynski | 428/451 |
| 3,637,416 | 1/1972 | Misch | 428/412 |
| 3,650,808 | 3/1972 | Gagnon | 428/451 |
| 3,650,814 | 3/1972 | Elder | 428/451 |
| 3,707,397 | 12/1972 | Gagnon | 428/451 |
| 3,708,386 | 1/1973 | Alexander | 428/437 |
| 3,781,184 | 12/1973 | Domicone | 428/447 |
| 3,955,035 | 5/1976 | Ito | 428/447 |

FOREIGN PATENT DOCUMENTS 1241236  8/1971  United Kingdom ........... 428/447

*Primary Examiner*—Ellis P. Robinson
*Attorney, Agent, or Firm*—Collins, Oberlin & Darr

[57] ABSTRACT

Multi-layer automotive glazing units that include, in their structures, transparent substrates with protective covers or shields over surfaces of the substrates; and that combine penetration resistant body portions with exposed abrasion resistant surfaces of a silica reinforced organopolysiloxane compound; and methods of producing such units.

1 Claim, 5 Drawing Figures

AUTOMOTIVE GLAZING UNITS AND METHOD OF PRODUCING THE SAME

BACKGROUND OF THE INVENTION

1. Field of the Invention

The present invention relates primarily to the production of transparent structures that include abrasion and weather resistant coatings on plastic sheets. More particularly it has to do with sun roofs, windshields and other automotive glazings embodying such coated sheets, and with procedures for incorporating improved coatings of this character into multi-layer glazing units to serve as the inboard surface thereof.

2. Description of the Prior Art

The desirability of coating relatively soft plastic materials with a harder, more scratch resistant layer has been recognized for many years, and a considerable number of patents have issued on the subject. Similarly, the potential advantages of including sheets or layers of plastic coated in this way in automotive glazings, and with the coating providing the inboard surface of the glazing, have been appreciated. However, to date, no commercially feasible structure of this character, capable of meeting the stringent requirements for use in automotive sight openings has been found.

SUMMARY OF THE INVENTION

A complete multi-layer glazing unit as contemplated by this invention includes, essentially, a substrate, and a protective cover supported by and over what would otherwise be an exposed surface of the substrate. The substrate may be primarily of glass and take such varied forms as the conventional laminated safety glass structures currently required in automobile windshields in this country, or the single sheet tempered glass glazing units commonly employed in automobile windows and backlights. On the other hand the substrate may be primarily of plastic, in the form of a single plastic sheet, or of a multilayer all-plastic or glass-plastic structure. Similarly, the protective cover for the substrate can be a single or multiple layer plastic structure, but it must present an exposed surface of a fully cured organopolysiloxane compound reinforced with silica.

One object of the invention is to provide an automotive glazing unit that is dimensionally, functionally and optically comparable to its commercially accepted standard glass counterpart, but that will appreciably reduce the number and severity of lacerative injuries to persons thrown against or otherwise brought into contact with the glazing under impact conditions; while, at the same time, exhibiting improved ability to decelerate movement of a person thrown against it without exceeding tolerable deceleration limits, and increased penetration resistance at both high and low temperatures.

Another object, when employing a primarily glass substrate, is to materially reduce the amount of flying glass, and of resultant and personal injury to car occupants, from collisions with birds or with objects thrown from overpasses or elsewhere outside the vehicle.

Still another, and the primary object of this invention is to incorporate materials in, and employ procedures for, producing such glazing units that will insure the resulting units meeting the exacting standards of appearance, safety, utility and commercial practicability required in present day automobiles.

To understand the problems that have rendered these objects heretofore unattainable, it must be appreciated that, although a layer of any one of a large number of plastic materials secured to the inside surface of a conventional glass window or windshield with practically any adhesive, will afford occupants of the automobile some protection from lacerative injuries, such structures can be expected to create more problems than they solve.

For example, while there are any numbers of adhesives and adhesion promoters available for securing plastics to glass, many of these create serious problems when employed in automotive glazings.

Similarly, plastic sheetings that are otherwise acceptable for use as protective coverings may be susceptible to "denting" or "marking" with any relatively sharp or pointed implement; and to overcome this, as well as the marring situations incident to normal wear and possible abuse, requires not only finding a functionally acceptable plastic, but also being able to employ it in a thickness that will give the indentation resistance necessary to minimize marking.

Another problem arises from the fact that glass-plastic structures must not only include an adequate protective cover or laceration shield over the glass, but must also be capable of surviving the so-called cold test. This is an accepted procedure in the auto industry for determining the thermo-mechanical stability of laminated structures, and involves subjecting them to a temperature of approximately $-65°$ F. until they come to equilibrium. During the test, the difference in coefficient of expansion between the glass and plastic will either rupture the bond between them or cause patches to spall off the glass surface of any unit that lacks the necessary stability.

A further problem is to insure the multi-layer glazing that includes the protective cover, attaining an acceptable Severity Index. The Severity Index is a factor that has become identified with relative safety of the windshields as determined by impact tests using a test dummy or a head form equipped with suitable accelerometers; and is calculated by the formula:

$$S.I. = \int A^{2.5} t$$

where A is acceleration in units of gravity and t is the time in seconds between the instant of impact of the head of the dummy with the test windshield to the end of the deceleration pulse.

Still another problem, and one of the most serious and most important from the optics standpoint, is that of providing acceptable resistance to weathering and wear. This problem arises with a plastic cover or shield on a glass substrate because, inherently, plastic is softer than glass. Also many plastics are quite easily and adversely affected by atmospheric conditions, so that their use in a protective cover will result in vision through the glazing unit becoming obscure after only a few weeks exposure. Since, at the same time the cover will also be subjected to the sort of scratching, abrasion, and marring which all automotive glazings encounter in any normal use, it can be understood why exposed surfaces of plastic have heretofore been generally considered unacceptable in automotive glazings.

Nevertheless the present invention makes it possible to provide acceptable and commercially feasible automobile glazings that have incorporated into their structures a protective cover or shield over the inboard glass surface that, in addition to inhibiting lacerative injuries, will not be adversely affected by exposure to the atmosphere, is unaffected by extreme cold, is clearly transparent and practically color free, does not adversely affect the Severity Index of the complete structure, and is highly resistant to marking, scratching and abrasion.

BRIEF DESCRIPTION OF THE DRAWINGS

In the drawings, wherein like numerals are employed to designate like parts throughout.

DESCRIPTION OF THE PREFERRED EMBODIMENTS

Figure 1:
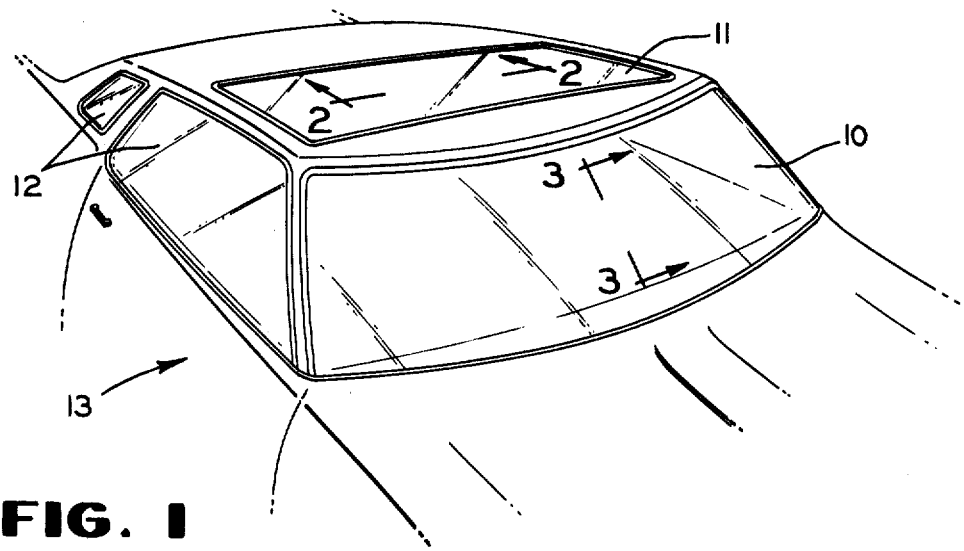
FIG. 1 is a perspective view of the front end of an automobile equipped with a sun roof, windshield and side lights, all produced in accordance with the glass substrate phase of this invention.
Figure 2:
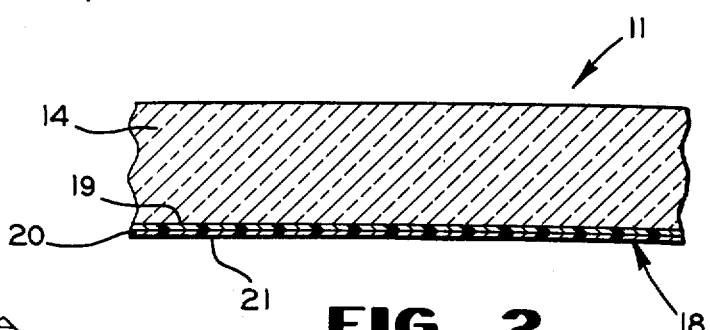
FIG. 2 is a transverse, sectional view through the sun roof of the automobile, taken substantially along the line 2—2 in FIG. 1.
Figure 3:
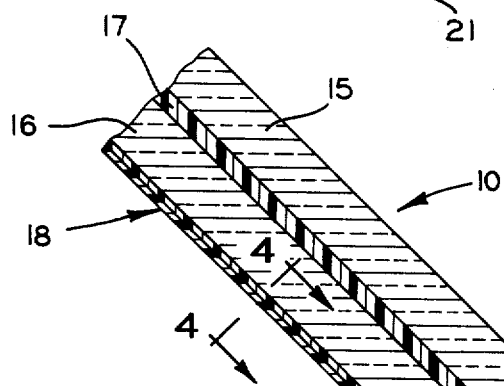
FIG. 3 is a vertical, sectional view through the windshield, taken substantially along the line 3—3 in FIG. 1.

As illustrated in FIG. 1, a windshield 10, sun roof 11 and side windows 12 made according to any one of the several phases of the invention can be mounted in an automobile 13, and will appear like ordinary automotive glazings of conventional construction. Thus, as shown in FIGS. 2 and 3 by way of examples, the glass substrate of the multi-layer, glass-plastic sun roof 11 may consist of a single sheet of tempered glass 14, while the primarily glass substrate of the windshield 10 may be conventional laminated safety glass comprising two sheets of glass 15 and 16 bonded together, under heat and pressure, by an interposed layer 17 of plastic.

In the illustrated embodiment of the windshield 10, the plastic interlayer 17 of the laminated glass is a 0.030" thick sheet of the high penetration resistant polyvinyl butyral disclosed in U.S. Pat. No. 3,231,461, while the glass sheets 15 and 16 are sheets of float glass, in thicknesses between 0.085" and 0.110", bonded to the interlayer 17 with the "bath surfaces out", as described in U.S. Pat. No. 3,708,386.

Similarly, in the sun roof embodiment, the single glass sheet 14 is of semi-tempered, or partially heat-treated, float glass approximately 0.100" thick, and with its "bath" surface to the outside. Also the glass in the sun roof is preferably tinted, colored, rendered phototropic or otherwise provided with means for filtering light.

Although some specific glass types and thicknesses have been set forth above, the glass substrate of the glazing structures of this phase of the invention may be in sheets or layers that vary from approximately 0.040" up to ⅛" and beyond in thickness; and any plastic interlayers within these glass parts may be in thicknesses between 0.015" and 0.060". For this reason it may also be necessary or desirable to somewhat vary the thickness and/or makeup of the plastic in the protective cover 18 carried by the substrate and which, as shown in FIG. 4, may be a multiple layer structure, and is bonded to the inboard glass surface of the substrate.

Figure 5:
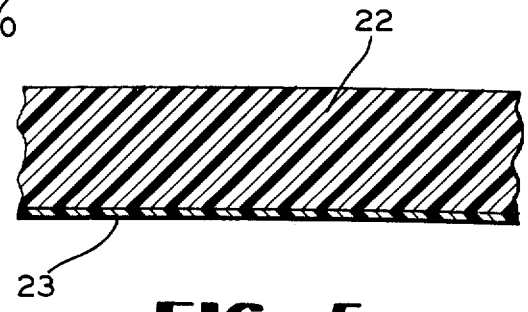
FIG. 5 is a view similar to FIG. 4 but showing a single layer plastic substrate and a single layer protective cover in accordance with the plastic substrate phase of the invention.

As explained above, among the important considerations for the glazing structure of this invention is that it be capable of acting to decelerate and resist penetration by a human head or other object thrown against it while, at the same time, presenting an exposed surface capable of effectively withstanding atmospheric exposure and the wear to which the inboard side of every automotive glazing is subjected during normal continuing usage.

Where a plastic substrate is employed, as illustrated in FIG. 5, it may be a single layer and, since its protective cover is required primarily for its abrasion resistance, it also may be a single layer. However with a primarily glass substrate, the protective cover may have to provide something more than wear resisting properties to the glazing unit.

Figure 4:
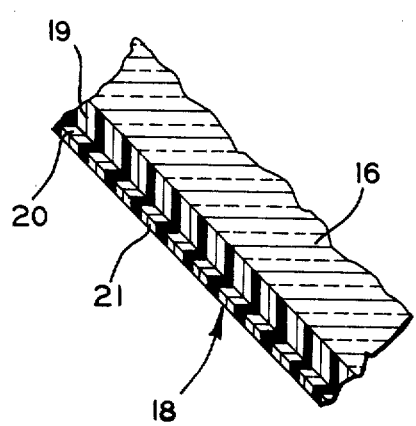
FIG. 4 is a fragmentary sectional view, on an enlarged scale, taken substantially along the line 4—4 in FIG. 3, and illustrates the structure of the protective cover that is bonded to the inboard glass surface of the substrate.

On this premise, the shield 18, shown in FIG. 4, is a multi-layer structure and the thickness of its layers as indicated there are preferred ones for incorporation into a windshield glazing that includes a laminated glass substrate, such as has been described in connection with FIG. 3. More particularly, this shield 18 comprises an approximately 15 mil (0.015") thick layer 19 of a relatively soft, extensible plastic material such as polyvinyl butyral, adhered to the inboard surface of the inboard glass sheet 16; an approximately 7 mil (0.007") thick layer 20 of a higher modulus, indentation resistant plastic such as a polyethylene terephthalate of the character sold by du Pont under their trade mark "Mylar" or by Celanese under their trade mark "Celanar"; and an approximately 0.110 mil (0.00011") thick coating or layer 21 of a harder and abrasion resistant material which can be described generically as a cured, organopolysiloxane compound reinforced with silica, and more specifically as a fully cured, silica reinforced methyl siloxane such as produced by Dow-Corning Corporation as their "C-Resin".

It is evident from this that the separate materials of which the glazing structures of this invention are composed may be known and, in some cases, are available commercially. However, when these materials as individual components are combined and used in the manner contemplated by this invention, and employing the procedures described, surprisingly new, useful and unexpected results are obtained.

For example, in the particular shield structure of FIG. 4, the layer 19 may be said to function primarily as an adhesive, but it also acts to cushion impact and, because of its elasticity and extensibility, to assist in resisting penetration by the head of a driver or passenger that may be thrown against the windshield.

The layer 20, with its greater indentation resistance, functions to protect the softer layer 19 and, by reason of its tensile strength, further contributes to the penetration resistance of the structure, while acting as a carrier for the abrasion resistant coating layer 21. Both of the layers 19 and 20 are nonlacerative, even when an impact occurs that is of sufficient magnitude to penetrate the plastic shield, and the layer 21 presents a surface hard enough to resist wear, weathering and other abuse without itself constituting a lacerative hazard.

Still more specifically, the plastic in the layer 20 may be in thicknesses of from ½ to 14 mils and, when polyethylene terephthalate is used, adequate adhesion to the layer 19 can be assured by subjecting it to a surface conditioning treatment, which may be carried out electrically or chemically, but is preferably done by direct contact with a gas flame for a length of time sufficient to alter the surface characteristics but not the bulk properties of the material. However, in lieu of the polyethylene terephthalate, other terephthalate esters and other plastic materials including polyesters, polycarbonates, polyurethanes, and acrylics may be employed.

Whatever the materials used in its layers, however, the matter of the overall thickness of the protective multilayer plastic cover or shield 18 is significant.

Thus, a layer 20 of polyethylene terephthalate, as the indentation resistant plastic, that is no more than 0.0005" to 0.014" thick will insure the glass-plastic glazing passing the "cold test". However, to provide indentation resistance and avoid marking, the layer 20 alone should be between about 5 and 10 mils thick. At the same time, to insure adequate balance between penetration resistance, and a Severity Index within the acceptable range, the combined thicknesses of the interlayer 17 (of the laminated glass part of the unit) and the adhesive layer 19 of the shield should not exceed 0.065", and the combined thicknesses of layers 17, 19 and 20 should not exceed 0.075".

In this connection, when the substrate of the glazing is a single glass sheet, as in the window, or the sun-roof structure of FIG. 2, it is preferred to increase the thickness of the adhesive layer 19; for example, from the 0.015" preferred with the three ply laminated glass substrate of FIG. 3, to 0.030".

In producing the glazing units of the glass substrate phase of the invention, it has been found practicable to coat the layer of indentation resistant plastic 20 of the protective shield with the harder, abrasion resistant layer or coating 21, and so utilize the layer 20 as a carrying sheet prior to incorporating it, with the abrasion resistant layer 21 thereon, into either a single glass layer structure such as the sun roof panel of FIG. 2 or the windshield structure of FIG. 3 as the protective cover or shield 18.

The abrasion resistance of the fully cured, silica reinforced organopolysiloxane compound of the layer 21 of this invention was found to exceed that of any material previously considered for the purpose. It was obtained from Dow-Corning Corporation as their "C-Resin" and, as such, was furnished in a 22.5% resin solids solution.

However, while a coating of the so obtained resin solution, flow coated onto an untreated polyethylene glycol terephthalate carrying sheet, appeared clear and bright, it exhibited a lack of adhesion to the polyester, as judged by the 40 ounce tape test, and a decided tendency to craze. Nevertheless, by the procedures described in the following examples, various kinds of indentation resistant plastic materials were flow coated with the silica reinforced, organopolysiloxane compound in a manner that successfully prepared them for incorporation, as the protective cover or laceration shield, into commercially practicable multi-layer, glass-plastic, automotive glazing units.

EXAMPLE I

Sheets of polyethylene terephthalate ("Celanar 4000" biaxially stretched but with no surface treatment) were cleaned with isopropanol, air dried, primed by flow coating with a solution of ½% beta-(3, 4 epoxy cyclohexyl) ethyl trimethoxysilane (Union Carbide's "A-186") in butanol, air dried and then heated for 30 minutes at 120° C. A silica reinforced organopolysiloxane compound (Dow-Corning's "C-Resin"), was diluted with butanol to 15% solids, flow coated over the so treated sheets at 30% relative humidity, and then air dried and cured for 4 hours at 120° C.

EXAMPLE II

Sheets of polyethylene terephthalate were coated as in Example I, except that the cleaned and dried sheets were primed by flow coating with ½% gamma-glycidoxypropyltrimethoxysilane (Union Carbide's "A-187") in butanol, air dried and then heated for 30 minutes at 120° C.

EXAMPLE III

Sheets of polyethylene terephthalate were processed as in Example I, except that the cleaned and dried sheets were primed with ½% of A-1100 silane (gamma-aminopropyl triethoxysilane) in a butanol solution. The solvent was allowed to air dry and then the sheet was over coated with a 1% solution of "Acryloid AT-50" (a member of a family of thermosetting acrylic resins made by Rohm and Haas) in 50% butanol and 50% cellosolve before applying the final resin coating.

The primers of Examples I and II may be represented by the generic formula:

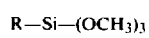

where R is an aliphatic organic radical containing an epoxide group.

The primer of Example I may be represented by the specific formula:

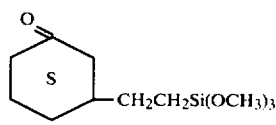

And the primer of Example II by the specific formula:

The primer system of Example III is a specific member of a family of primers that can be represented by a silane in conjunction with a thermosetting acrylic resin.

The coatings on the sheets of Examples I through III passed the 40 ounce tape (Minnesota Mining and Mfg. Co's. "#710" acetate fiber) test before and after being incorporated into multilayer units in accordance with the invention; and the abrasion resistance of the coatings were determined on the Taber Abrader before and after exposure in the Weather-Ometer for over 500 hours facing the light with the following results:

|  |  | % Haze |  |  |
|---|---|---|---|---|
| Example 1 | Original | 100 Rev. | 200 Rev. | 300 rev. |
| Unexposed | 1.9 | 2.7 | 4.2 | 4.0 |
| Exposed | 1.3 | 2.5 | 4.1 | 5.2 |
|  |  | % Haze |  |  |
| Example II | Original Haze | 100 Rev. | 200 Rev. | 300 Rev. |
| Unexposed | 1.0 | 2.6 | 3.3 | 3.0 |
| Exposed | 1.6 | 2.0 | 3.0 | 4.6 |
|  |  | % Haze |  |  |
| Example III | Original Haze | 100 Rev. | 200 Rev. | Rev. |
| Unexposed | 1.4 | 2.0 | 2.5 | 4.0 |

| -continued | | | |
|---|---|---|---|
| Exposed | 1.5 | 2.1 | 2.8 | 4.1 |

The Taber abrasion test is described in ASTM Test D-1044-56. Specifically, for the instant purpose, a 500 gram load was applied to the CS-10F wheels, and the percent of haze in the track of the test was determined after 100, 200 and 300 revolutions respectively.

For purposes of comparison, uncoated control samples of the polyethylene terephthalate sheets, of polymethylmethacrylate sheets, and of polycarbonate sheets were subjected to this same test with the following results:

|  | % Haze | | |
|---|---|---|---|
|  | 100 Revs. | 200 Revs. | 300 Revs. |
| Polyethylene terephthalate | 47.0% | | |
| Polymethylmethyacrylate | 36.5% | 36.6% | 37.8% |
| Polycarbonate | 40.0 | 45.6% | 46.0% |

In the case of the polyethylene terephthalate the uncoated control sample was considered worthless for vision after 100 revolutions and the test discontinued.

In additional Examples (IV, V, and VI), the procedures of Examples I, II, and III respectively were used in priming and coating 0.007" thick sheets of du Pont's flame treated, uniaxially stretched "Mylar" (polyethylene terephthalate) instead of the biaxially stretched, untreated, "Celanar" (polyethylene terephthalate) sheets of Examples I to III. The coated sheets of Examples IV, V, and VI were exposed and tested in the manner reported for Examples I, II and III, and similar results obtained.

The only significant difference noted between the treated and untreated types of polyethylene terephthalate sheeting is that a silica reinforced organopolysiloxane coating will exhibit initial adherence (as determined by the tape and Taber tests) to the flame treated "Mylar" used in Examples IV, V and VI, without the priming step described therein. However such directly applied coatings lose their adhesive properties after even short exposure in the Weather-Ometer.

Coated sheets, produced as described in Examples I to VI, then bonded to a compatible glass part in the manner described in connection with FIGS. 1 to 4, constitute glazing units as contemplated by the glass substrate phase of this invention.

Turning now to the plastic substrate phase of the invention, there has been shown in FIG. 5 a single sheet of a durable plastic material 22 provided with a protective cover or shield 23 in the form of a layer of a silica reinforced organopolysiloxane compound similar to the layer 21 in FIGS. 2 to 4.

The following are specific examples of ways in which the articles of this phase of the invention were successfully produced:

EXAMPLE VII

A clean surface of a ¼" thick sheet of polymethyl methacrylate was primed with a ½% solution of "A-186" in butanol, air dried, and then heated for 1 hour at 80° C. The primed sheet was then flow coated with a solution of a silica reinforced organopolysiloxane compound that had been diluted with butanol to approximately a 15% solution of resin solids, dried, and heated for 6 hours at 80° C.

EXAMPLE VIII

A sheet of polymethyl methacrylate was cleaned and dried, and then flow coated with a solution made up of 67 parts by volume of a solution of "C-Resin" containing 22½% resin solids, 28 parts of 99% isopropanol and 5 parts of glacial acetic acid. The coating was air dried and then cured for 6 hours at 80° C.

Excellent clear, transparent, haze free and tightly adherent coatings were produced by the methods of both Examples VII and VIII which, when given the Taber abrasion test showed the following results:

|  | Percent Haze | | |
|---|---|---|---|
|  | 100 Revs. | 200 Revs. | 300 Revs. |
| Example VII | 1.5% | 2.4% | 3.6% |
| Example VIII | 1.5% | 2.4% | 3.2% |

It should be explained in connection with Examples VII and VIII that the as received, undiluted, 22½% solids solution of the "C-Resin" was found to adhere better to the methyl methacrylate sheeting than the butanol diluted material of Example VII, or the corresponding material of Example VIII when diluted only with isopropanol.

However, coatings of the undiluted "C-Resin" exhibited their characteristic tendency to craze, so that the use of the diluted material in both examples was required to correct the crazing tendency, while the use of the primer in Example VII and the inclusion of the acetic acid with the diluent in Example VIII restored the necessary adhesive properties.

In this connection, it should be mentioned that, while the Taber test is used primarily to determine abrasion resistance, its results are highly significant in indicating the degree of adhesion of the coating to the carrier sheet, and of the effectiveness of the adhesion promoters of this invention.

Thus, the Taber test on coatings as applied in Examples VII and VIII, but without the priming step of Example VII or the acetic acid of Example VIII, gave the following results:

| % Haze | | |
|---|---|---|
| 100 Rev. | 200 Rev. | 300 Rev. |
| 3.0% | 7.0% | 13.6% |

And, whereas the coatings of Examples VII and VIII showed good adhesion under the tape test after more than 1000 hours in the Weather-Ometer, the coatings on the unprimed surfaces and without acetic acid in the diluent failed the tape test after 383 hours.

Similarly, the Taber test on coatings applied as in Example I but without the priming step, gave the following results:

| % Haze | | | |
|---|---|---|---|
| 0 Revs. | 100 Revs. | 200 Revs. | 300 Revs. |
| 1.2% | 15.2% | 41.1% | 46.9% |

The phase of the invention in which the substrate is primarily of plastic of course has a weight advantage over the glass substrate phase. Moreover the ultra thin silica fortified organopolysiloxane abrasion resistant coating can be adhered directly to, and on one or both sides of, the substrate because the primarily plastic substrate can also serve not only as the carrier sheet, but also to fulfill the functions of the layers 19 and 20 of the previously described shield 18 in adding body to the structure and to cushion impact and resist penetration. Nevertheless the shield 18 described above in connection with the glass substrate phase can, as well, be used in the plastic substrate phase where desired.

It is to be understood that the forms of the invention herein shown and described are to be taken as preferred embodiments only of the same, and that various changes in the size, shape, and arrangements of parts, as well as various procedural changes, may be resorted to without departing from the spirit of the invention as defined in the following claims.

For instance, while a 15% solids solution of the coating material is preferred, solutions containing from 12 to 18% can be employed; similarly butanol is the preferred solvent because it lends desirable coating properties to the solution, but other solvents may be used; and various relative humidities below 35%, with curing times as low as 1½ hours have given acceptable results.

We claim:

1. In a clear transparent temperature stable glazing structure consisting essentially of a transparent substrate with a protective shield thereover carrying a coating of silica reinforced organopolysiloxane; a sheet of float glass not appreciably more than 0.100" in thickness providing said substrate; and said protective shield over said substrate comprising a layer of a relatively soft and extensible plastic in a thickness between approximately 0.015" and 0.030" and having one surface bonded to a surface of said substrate, a carrying sheet in the form of a layer of indentation resistant polyester plastic in a thickness between approximately 0.0005" and 0.014" and having one surface bonded to the opposite surface of said soft and extensible plastic layer, and an abrasion resistant coating of a fully cured silica reinforced methyl siloxane compound on and tightly adherent to the opposite surface of said carrying sheet.

* * * * *